United States Patent
Kalverkamp

(10) Patent No.: US 9,439,346 B2
(45) Date of Patent: Sep. 13, 2016

(54) HARVESTER FOR POTATOES, BEETS AND OTHER ROOT CROPS

(71) Applicant: Grimme Landmaschinenfabrik GmbH & Co. KG, Damme (DE)

(72) Inventor: Klemens Kalverkamp, Damme (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 0 days.

(21) Appl. No.: 13/716,148

(22) Filed: Dec. 16, 2012

(65) Prior Publication Data

US 2013/0153248 A1    Jun. 20, 2013

(30) Foreign Application Priority Data

Dec. 16, 2011    (DE) .................. 10 2011 121 180

(51) Int. Cl.
*A01D 17/00*    (2006.01)
*A01D 17/10*    (2006.01)

(52) U.S. Cl.
CPC .............. *A01D 17/00* (2013.01); *A01D 17/10* (2013.01); *A01D 2017/103* (2013.01)

(58) Field of Classification Search
CPC ................. A01D 2017/103; A01D 17/10
USPC ................................ 171/130, 132
See application file for complete search history.

(56) References Cited

U.S. PATENT DOCUMENTS

| | | | | |
|---|---|---|---|---|
| 1,417,537 A * | 5/1922 | Lucy | ............................... | 171/121 |
| 1,960,857 A * | 5/1934 | Stoltenberg | ................... | 209/678 |
| 2,010,335 A * | 8/1935 | Stoltenberg | ...................... | 171/14 |
| 2,187,206 A * | 1/1940 | Lloyd-Jones et al. | ........ | 171/120 |
| 2,215,516 A * | 9/1940 | Schooler | .......................... | 171/17 |
| 2,369,723 A * | 2/1945 | Denlinger | ........................ | 171/14 |
| 2,528,689 A * | 11/1950 | Flynt | ................................ | 171/10 |
| 2,718,110 A * | 9/1955 | Butler | ............................. | 171/27 |
| 3,227,276 A * | 1/1966 | Leighton et al. | .......... | 209/139.1 |
| 3,237,699 A * | 3/1966 | Bretveld et al. | ................ | 171/18 |
| 3,240,276 A * | 3/1966 | Conant et al. | .................. | 171/17 |
| 3,340,935 A * | 9/1967 | Csimma | ........................... | 171/14 |
| 3,442,379 A | 5/1969 | Schneider et al. | | |
| 3,690,383 A * | 9/1972 | Malley et al. | ................ | 171/126 |
| 3,989,111 A * | 11/1976 | Hobbs | ........................... | 171/101 |
| 4,448,257 A | 5/1984 | McRae | | |

(Continued)

FOREIGN PATENT DOCUMENTS

BE    1013579 A3    4/2002
DE    1 041 718    10/1958

(Continued)

*Primary Examiner* — Thomas B Will
*Assistant Examiner* — Joel F. Mitchell
(74) *Attorney, Agent, or Firm* — Gudrun E. Huckett

(57) ABSTRACT

A harvester for potatoes, beets and other root crops has digging shares arranged in a leading position in the travel direction of the harvester. A screen conveyor receiving a harvested mix and conveying the harvested mix in a conveying direction opposite to the travel direction is provided. The screen conveyor has a screen conveyor belt and guide elements supporting laterally the screen conveyor belt. The screen conveyor belt has a upwardly facing conveying stretch and a leading return pulley proximal to the digging shares. The conveying stretch forms a screening zone that, at least in the area of the leading return pulley, is oriented so as to ascend in the conveying direction. The screen conveyor belt is adjustable to different conveying slants in the area of the conveying stretch.

18 Claims, 8 Drawing Sheets

(56) References Cited

U.S. PATENT DOCUMENTS

| | | | |
|---|---|---|---|
| 4,842,076 A * | 6/1989 | Welp | 171/124 |
| 5,528,890 A * | 6/1996 | Gray et al. | 56/16.6 |
| 7,789,166 B2 * | 9/2010 | Wallace | 171/14 |

FOREIGN PATENT DOCUMENTS

| DE | 1 072 422 | 12/1959 |
|---|---|---|
| DE | 317073 / 6601794 | 3/1969 |
| DE | 66 07 825 | 4/1971 |
| DE | 2 326 215 | 12/1974 |
| DE | 94 41 130 U1 | 2/1996 |
| EP | 0 216 098 B1 | 4/1987 |
| EP | 1 297 731 A1 | 4/2003 |
| GB | 2 146 219 A | 4/1985 |
| NL | 9300109 | 8/1994 |
| SE | 464 329 B | 4/1991 |
| SU | 1618320 A1 | 1/1991 |

* cited by examiner

HARVESTER FOR POTATOES, BEETS AND OTHER ROOT CROPS

BACKGROUND OF THE INVENTION

The invention relates to a harvester for potatoes, beets and other root crops, comprising a screen conveyor receiving a harvested mix, wherein the screen conveyor has at least one screen conveyor belt that can be supported by lateral guide elements, respectively, wherein at least one conveying stretch positioned at the top and movable opposite to the travel direction of the harvester forms a screening zone that at least in the area of a return pulley that adjoins the leading digging shares can be oriented so as to ascend in the conveying direction.

Machines for harvesting potatoes, beets and other root crops are based on various embodiments of mechanical apparatus with which the harvested crop removed from the soil is separated from entrained admixtures such as stones, soil clods and similar admixed parts. In a system disclosed in DE 10 41 718 the harvested mix is lifted from a soil ridge by means of a digging share and is transferred by a conveying belt into a cleaning stretch with a screen. In a potato harvester according to DE 10 72 422 a screen with a screening chain is provided wherein the latter is moved so as to ascend, beginning at the leading digging share, opposite to the travel direction of the harvester; in this way, separation of the harvested crop from the admixtures is taking place. Similar constructions with a screen that separates the harvested crop from the admixture are disclosed in DE 31 70 73 and DE 66 07 825 as well as DE 23 26 215.

Also known are screen devices for harvesters in which additional movements or excitations are introduced into a respective conveying stretch of the screen conveyor belt so that the separation process is improved in this way. In a system according to EP 0 216 098 B1, the excitation of the screen conveyor belt is achieved by a change of the angular speeds. In a screen conveyor according to DE 94 14 130 U1 the working stretch of the screen conveyor belt that forms the screening zone is provided with inwardly movable adjusting means. These adjusting means, as individual auxiliary elements, are correlated with the conveying stretch that receives the harvested mix so that, by forming at least one "vertical" step, a modified wave-shaped active zone, with a correlated "fall acceleration" of the harvested mix, is provided on the screen conveyor belt. These drop stages that are adjustable with respect to the step height generate a relative movement of the parts of the harvested mix so that separation of soil from the crop is improved but, at the same time, damage of the harvested crop, in particular potatoes, cannot be excluded. The mounted position of the entire screen conveyor belt within the device has a constant incline in the conveying direction.

DE 1 297 731 A1 discloses a potato harvester in which, starting at the digging share, a first screen conveyor belt and a second screen conveyor belt are provided. These two screen conveyor belts interact with each other in the area of an intermediately positioned drop stage. The two conveying belts each define an ascending section with constant incline angle so that the harvested mix is moved upwardly across uniformity ascending screening zones.

The invention concerns the problem of designing a screen conveyor in the area of the respective movable conveying stretch to be adaptable, with minimal technical expenditure, to changing soil conditions such that with a substantially automated modification of the respective conveying conditions a gentle separation of the harvested crop contained in the harvested mix is possible.

SUMMARY OF THE INVENTION

In accordance with the present invention, this is achieved in that a harvester for potatoes, beets and other root crops in accordance with the present invention has a screen conveyor belt that is adjustable in the area of the at least one conveying stretch to different conveying slants.

With regard to important further configurations, reference is being had to the dependent claims.

The harvester in accordance with the invention is provided with a screen conveyor in which the screen conveyor belt at least in the area of a first conveying stretch is adjustable in such a way that the supplied harvested mix can be moved, as needed, along differently inclined conveying slants. With "uniform" sections of the conveying stretch screening zones are defined that enable a gentle movement of the harvested crop. In this connection, it is provided that, in the conveying direction of the screen conveyor belt, inclined conveying stretch sections provided with different incline angles, respectively, are utilizable. These conveying slants are configured as adjustable conveying stretch sections of the conveying stretch such that they are essentially free of any steps and pass essentially continuously into each other.

The harvested mix that is dug up by the digging shares can have various consistencies, in accordance with the respective soil conditions, wherein the harvested crop, for example, can be in a mix that contains sandy and/or loamy structures. With the adjustability in accordance with the present invention of conveying slants in the area of the conveying stretch of the screen conveyor belt, it is possible to react quickly to the different soil conditions and to react at essentially any point in time of the harvesting process with different conveying slants to changing soil and/or moisture conditions of the soil. The screening effect of the system can be optimized by targeted adjustment of the incline angle of the conveying stretch or of the area of a respective screening zone in such a way that, while a gentle treatment of the harvested crop that is being moved permanently in an upward direction is ensured, an optimal separation of the crop from the soil structures in the area of the screening zones is realized at the same time.

In accordance with the respective length of the screen conveyor belt, changeable conveying stretch sections of the at least one screening zone can be utilized. In this connection, the conveying slants along the screen conveyor belt can be variably preset. Based on a horizontal reference plane that can be defined within the system, the screen conveyor belt can even be adjusted to different incline angles or slopes in the area of several conveying slants.

By means of at least one adjusting assembly that can be actuated manually or by a motor, the conveying stretch sections of the screen conveyor belt that are defined as conveying slants can be adjusted continuously. In this connection it is also conceivable to change the conveying slants during a conveying phase that is already in progress. Also, a substantially automated change of the conveying slants is conceivable.

The configuration according to the invention makes it possible that along the conveying stretch more than only two conveying stretch sections are provided that have changeable conveying slants, respectively. It has been found that the screen conveyor belt has optimal screening action when it is advantageously provided with changeable incline angles in the area of the conveying slants in a range between 0 degrees and 60 degrees, preferably between 15 degrees and 40 degrees. These incline angles can be of the same magnitude in the area of the conveying slants, respectively. It is provided that the sections of the conveying stretch are adjusted to different slant angles, respectively, so that in the conveying direction varying screening conditions are effective. These adjustments of the conveying slants can be individually performed in each conveying stretch section. Also, it is conceivable that a joint adjustment of all sections of the conveying stretch is realized, preferably simultaneously.

The constructive realization of this concept according to the invention with adjustable conveying slants provides that the screen conveyor belt at least in the area of its conveying stretch extending from the leading return pulley to the rear return pulley has an adjusting device that engages lateral edges of the conveying stretch that are positioned opposite each other in a transverse direction of the harvester. On this adjusting device, guide elements are provided that interact with the conveying stretch of the screen conveyor belt, preferably from below, so that an adjusting movement in the area of the adjusting device is transmitted by means of the guide elements onto the conveying stretch.

The guide elements are movable individually or together in such a way that, beginning at the leading return pulley that defines the start of the screening zone, the respective changes of the conveying slants are effected in the conveying stretch sections that can be defined by the guide elements. By arranging several guide elements arranged along the screening zone so as to be spaced apart from each other, it is conceivable to move them in groups. In this connection, a plurality of conveying stretch sections with different conveying slants can be formed along the conveying stretch in such a way that the harvested mix is moved on "steep" and "less steep" conveying stretch sections so that therefore screening phases of different intensity are effective.

Based on the generally known support frame construction of the harvester, wherein the screen conveyor belt or its lateral edges are received between oppositely positioned frame parts, an additional second frame structure is integrated into the harvester system for the inventive configuration with the adjusting device that is acting on the conveying stretch. This second frame structure is arranged within the first harvester frame such that a construction like a frame-in-frame system is formed and, in this way, the second inner frame structure forms a basic assembly for the inventive adjustability of the conveying slants on the screen conveyor belt.

The guide elements in the form of roller bodies that are known in general are secured on the adjusting device interacting with the inner frame structure in such a way that this roller system forms individually or jointly movable elements. Also, it can be provided that the guide elements are moved in groups.

As an improvement of the known arrangements of screen conveyor belts, in which the screen conveyor belt adjoins immediately with its return pulley the digging shares, it is provided that, beginning at this leading return pulley, in particular a section of the conveying stretch that is extending from this return pulley to a first guide element is adjustable so as to be particularly variable with respect to different conveying slants. Based on the application of a continuous (endless) circulating belt used as a screen conveyor belt, it is apparent that this leading section of the conveying stretch (in the area of the leading return pulley up to the first one of the guide elements) can be adjusted relative to the remaining part of the conveying stretch (in the form of the downstream screening zone) to the different conveying slants.

Different embodiment variants are conceivable for the constructive realization of this component combination of guide elements, adjusting device, and adjusting member. An advantageous simple configuration is achieved in that the guide elements are secured on a support rail that is movably connectable with the inner frame structure based on the principle of the afore described frame-in-frame system. In this connection, it is provided that upon movement of the support rail about a terminal pivot point a change of the incline angle is realized. When doing so, the section of the conveying stretch is moved that is located between pivot point and the guide element that is provided at the other (opposite) end of the support rail. At the same time, the leading conveying stretch section that is extending to the leading return pulley (or the digging share) can be entrained and also pivoted because the return pulley is preferably supported stationarily. Accordingly, along the length of the conveying stretch a screening zone is formed that has at least two conveying stretch sections with different conveying slants.

A further embodiment of this adjustability by means of the movable guide elements provides that at least one of the guide elements is supported on at least two support sections of the second frame structure. The support sections are supported on the inner frame structure so as to be moveable relative to each other by means of the at least one adjusting member. With respect to the entire construction of the harvester, it is understood that two sets of two pair-wise interacting support sections are provided and the two sets are located opposite each other in the transverse direction. They are movable, respectively, by means of a pivoting and/or pushing movement that can be introduced by the adjusting member. The guide elements are then entrained such that thereby the conveying slants of the neighboring sections of the conveying stretch are changed in regard to the amount of the incline angle, respectively.

The constructive design of the system provides that for the adjusting device a mechanical, electrical and/or hydraulically drivable adjusting member is provided, as desired. Likewise, it is conceivable that the adjusting device is provided with several adjusting members. The respective control or regulation of this adjusting unit can be advantageously realized by means of an operating unit in the tractor of the harvester. Likewise, it is conceivable that a substantial automatic control and adjustment of the conveying slants is activated by means of sensor-detected measured data that are processed by a control software.

Based on the afore described concept of the screen conveyor with changeable conveying slants, this basic solution can in principle also be applied to a screen system in harvesters in which the screening zone of the respective conveying stretch is formed by several screen conveyor belts that are arranged sequentially. An efficient configuration can be achieved in that at least the screen conveyor belt that adjoins immediately the digging shares is provided with a support and adjusting construction which enables the adjustment of different conveying slants. Also, it is conceivable to adjust the sequentially arranged screen conveyor belts individually or jointly to appropriate conveying slants with optimal separation efficiencies.

BRIEF DESCRIPTION OF THE DRAWING

Further details and advantages result from the following description and the drawing in which several embodiments of the screening conveyor according to the invention are schematically illustrated in more detail.

DESCRIPTION OF THE PREFERRED EMBODIMENTS

Figure 1:
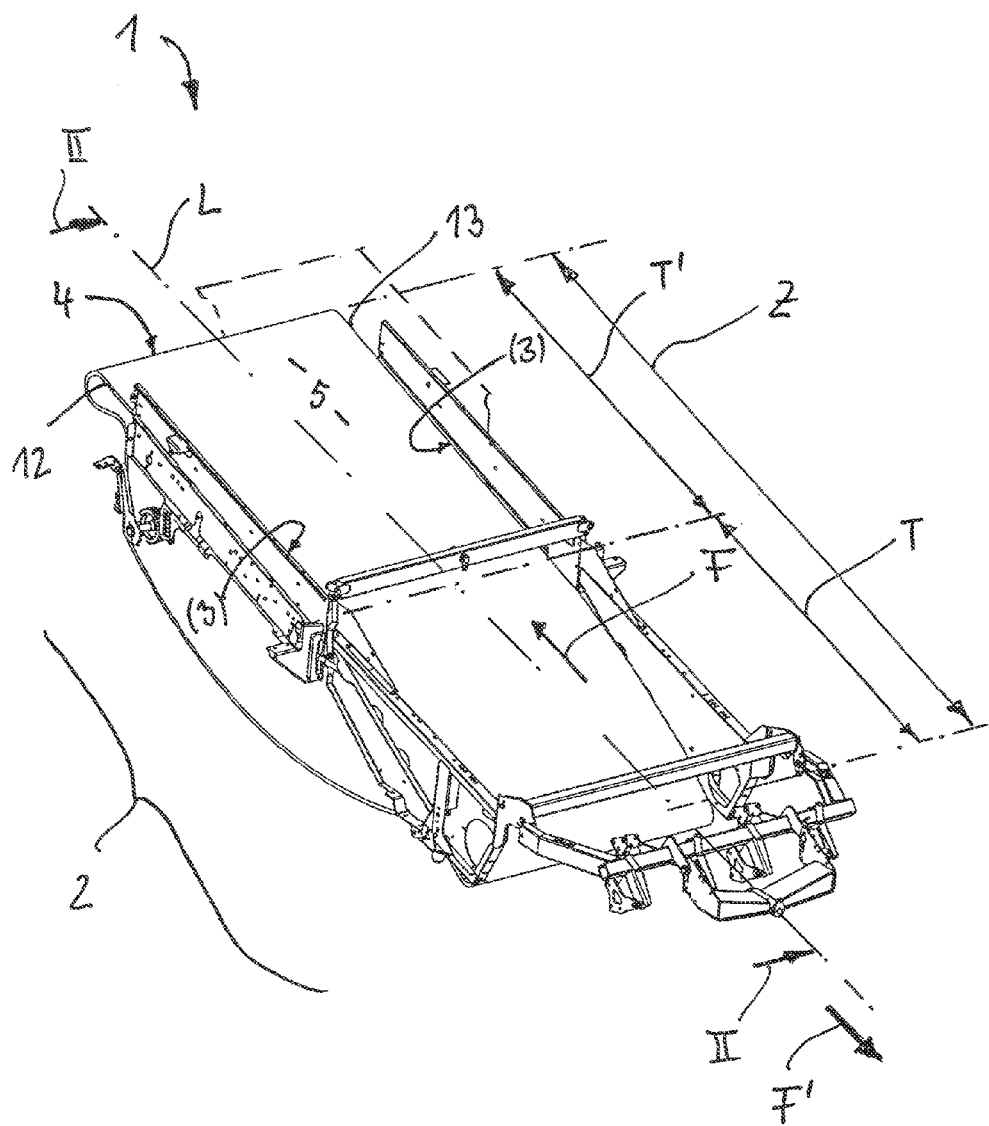
FIG. 1 is a perspective detail illustration of a harvester with a screen conveyor in a first embodiment.
Figure 2:
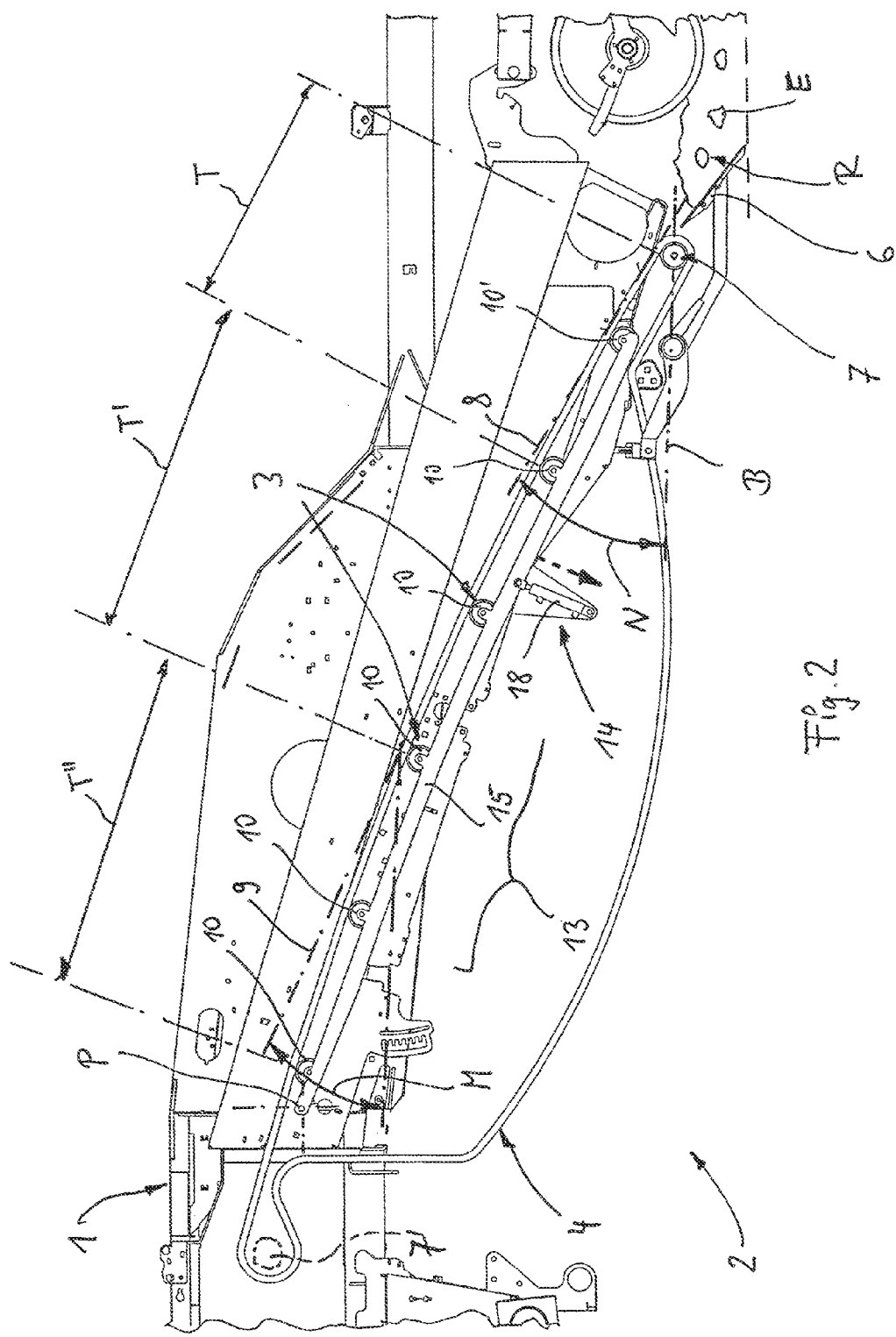
FIG. 2 is a partially sectioned side view of the harvester according to section line II-II in FIG. 1 with an adjusting device that engages the screen conveyor belt from below.

FIG. 1 shows a harvester for potatoes, beets and similar root crops E (FIG. 2) referenced as a whole by reference numeral 1 wherein the harvester 1 is provided with a screen conveyor 2 that receives the harvested mix R. The screen conveyor 2 has at least one screen conveyor belt 4 that is supported by means of lateral guide elements 3 at the longitudinal lateral edges. In this connection, at least one conveying stretch 5 of the screen conveyor belt 4 that is located at the top (faces upwardly) and is movable opposite to the travel direction F' forms a screening zone Z that can be oriented, at least in the area of a return pulley 7 adjoining (being proximal to) the leading digging shares 6, so as to ascend in the conveying direction F (FIG. 2).

Based on this known configuration of a screen conveyor 2, the concept according to the invention provides that the screen conveyor belt 4 in the area of its at least one conveying stretch 5 can be adjusted in such a way that for the harvested mix R different conveying slants 8, 8'; 9, 9' will be effective so that the cleaning action of this screen conveyor 2 can be variably adjusted across a great range.

Figure 3:
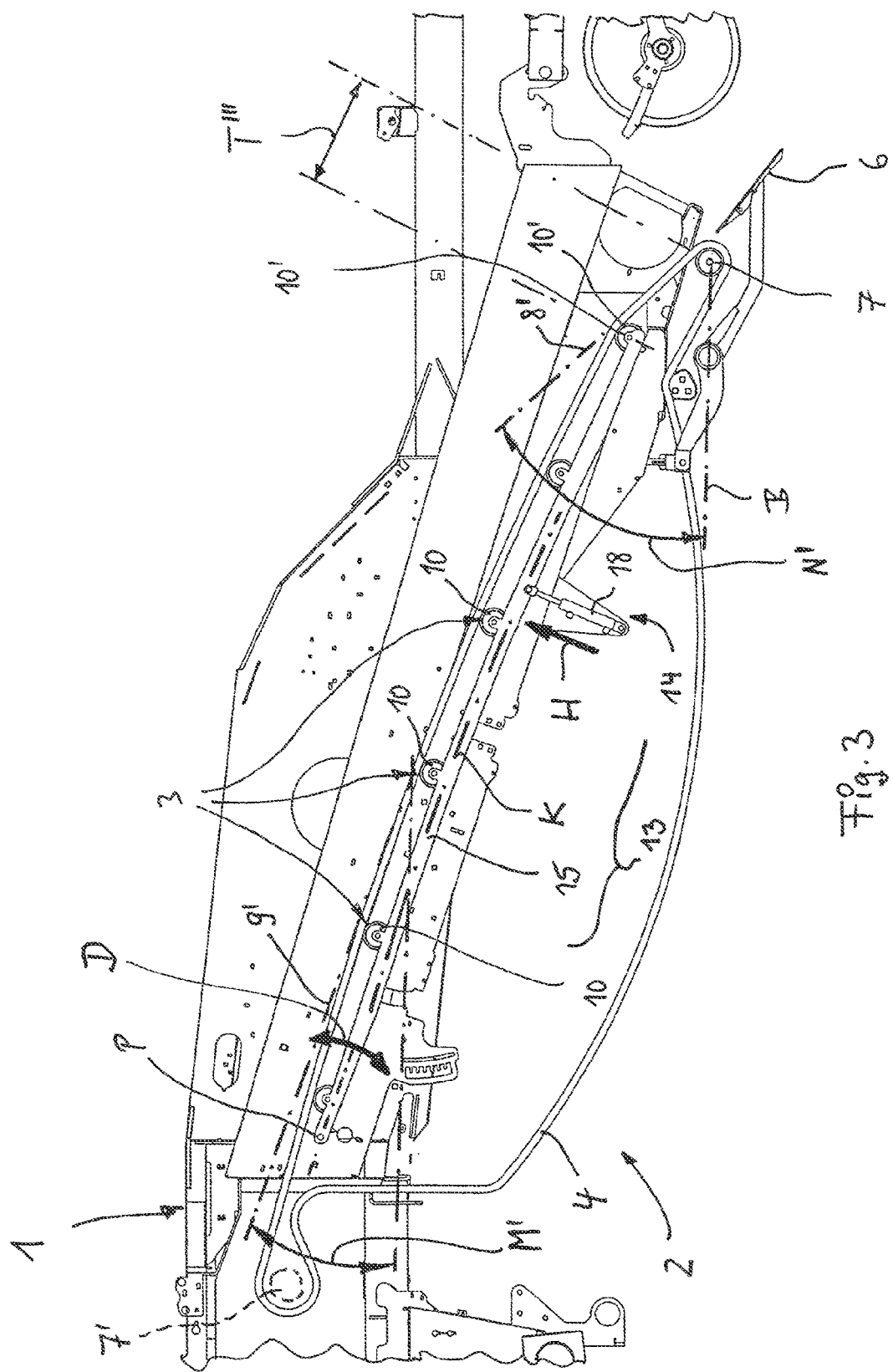
FIG. 3 is a side view similar to FIG. 2 wherein the screen conveyor belt is moved by means of the adjusting device into a different position of use.

The adjustability of the respective conveying slants 8, 8'; 9, 9' is designed to be able to define conveying stretch sections T, T' (FIG. 1) that are variably adjustable or modifiable with respect to their length within the at least one screening zone Z so that in this way these screen conveyors 2 can be matched optimally to the harvested crop E, for example, in case of a potato harvester or beet harvester. Based on the side views of FIGS. 2 to 5, it is apparent that the screen conveyor belt 4 based on the horizontal reference plane B is provided with conveying slants 8, 8'; 9, 9' that are adjustable to different incline angles N, N'; M, M' (FIG. 2, FIG. 3).

In practical tests it has been found to be advantageous that the screen conveyor belt 4 is provided with incline angles N, M in the area of the conveying slants 8, 9 that are adjustable in a range between 0 degrees and 60 degrees, preferably between 15 degrees and 40 degrees. The construction of this improved screen conveyor belt 4 provides that the conveying slant of the screen conveyor belt 4 is particularly continuously changeable or adjustable. In this connection, it is also conceivable that the conveying slants 8, 8'; 9, 9' can be changed during an ongoing conveying phase so that a quick reaction to changing harvesting conditions can be realized.

The illustration according to FIG. 2 shows that along the conveying stretch 5 more than two, namely three, conveying stretch sections T, T', T" are provided that each have a changeable conveying slant in accordance with the illustrated course. This is only one example of a conceivable expansion of the variable adjusting system wherein, based on the existing side views, for example also the configuration of the guide elements 3 in the form of guide rollers 10 is apparent; with this configuration, based on the flexibility of the belt 4, in the area of each of these guide rollers 10 a change of the adjoining conveying slant is also conceivable in such a way that the entire conveying stretch 5 may have a contour K (FIG. 3) that follows a "convex arc shape" (beginning at the leading guide roller 10).

Looking at these constructive variants, it is apparent that the conveying stretch sections T, T', T" of the conveying stretch 5 can be adjusted to same or different incline angles 9, 9'. In this connection, constructions are conceivable in which the conveying stretch sections T, T', T" are affected jointly by a joint adjustment. Also, it is conceivable that the respective conveying slants of the conveying stretch sections T, T', T" are individually adjusted.

For realizing the afore described construction features, it is provided that the screen conveyor belt 4, at least in the area of the conveying stretch 5 that extends from the leading return pulley 7 to the rear return pulley 7', has an adjusting device 13, 13' that engages lateral edges 11, 12 (FIG. 1) of the conveying stretch 5 that are opposite each other in the transverse direction, wherein the adjusting device 13, 13' supports by means of at least one adjusting member 14, 14' the guide elements 3 or the guide rollers 10, 10' so as to be movable. In accordance with the course of the screen conveyor belt 4, it is provided that by means of the adjusting device 13, 13', the conveying stretch section T" (FIG. 3) of the conveying stretch 5 that, beginning at the leading return pulley 7, is extending to the first guide roller 10' can be displaced so that relative to the conveying stretch section or sections T', T" of the conveying stretch 5 the differently "steep" conveying slants 8' are effective.

The concept of this adjusting device 13, 13' provides that the respective guide elements 3 or 10, 10' are supported so as to be movable each individually or jointly. In the first embodiment of the adjusting device 13 illustrated in FIG. 2, it is provided that the guide elements 3 or 10, 10' form a jointly adjustable group.

In the configuration of the adjusting device 13 according to FIG. 2 and FIG. 3, the guide rollers 10, 10' are secured on a support rail 15 that is connected to the adjusting member 14. This support rail 15 provides the possibility that upon its displacement about a terminal pivot point P the guide elements 10, 10' provided between the pivot point P and the opposite end of the support rail 15 are also moved and thereby the conveying stretch sections T, T', T" defined within the conveying stretch 5 are changed such that optimal conveying slants are adjusted for the processing step. In the illustrated embodiment according to FIGS. 2 and 3, the terminal pivot point P is positioned at the end that is opposite the leading guide roller 10' so that the afore described pivot movement (arrow D, FIG. 3) is activated by means of the adjusting member 14 embodied as a lifting cylinder 18 in a lifting direction H (FIG. 3) and therefore, beginning with the "flat" position of use according to FIG. 2, is moved (angles N, N') into the "steep" position of use according to FIG. 3, at least in the area T".

Figure 4:
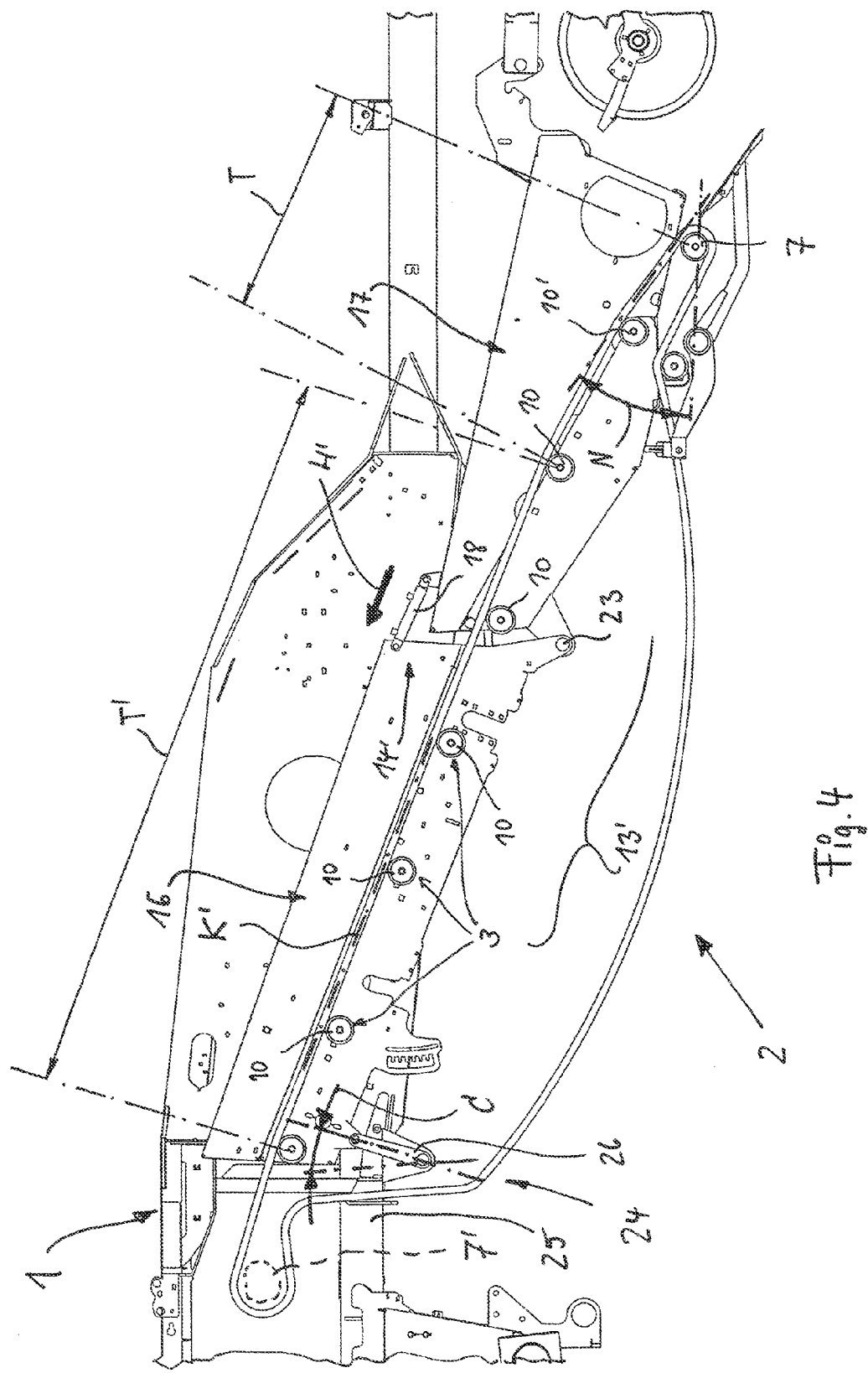
FIG. 4 shows another configuration in a side view similar to FIG. 1 with an adjusting device that receives the screen conveyor belt.
Figure 5:
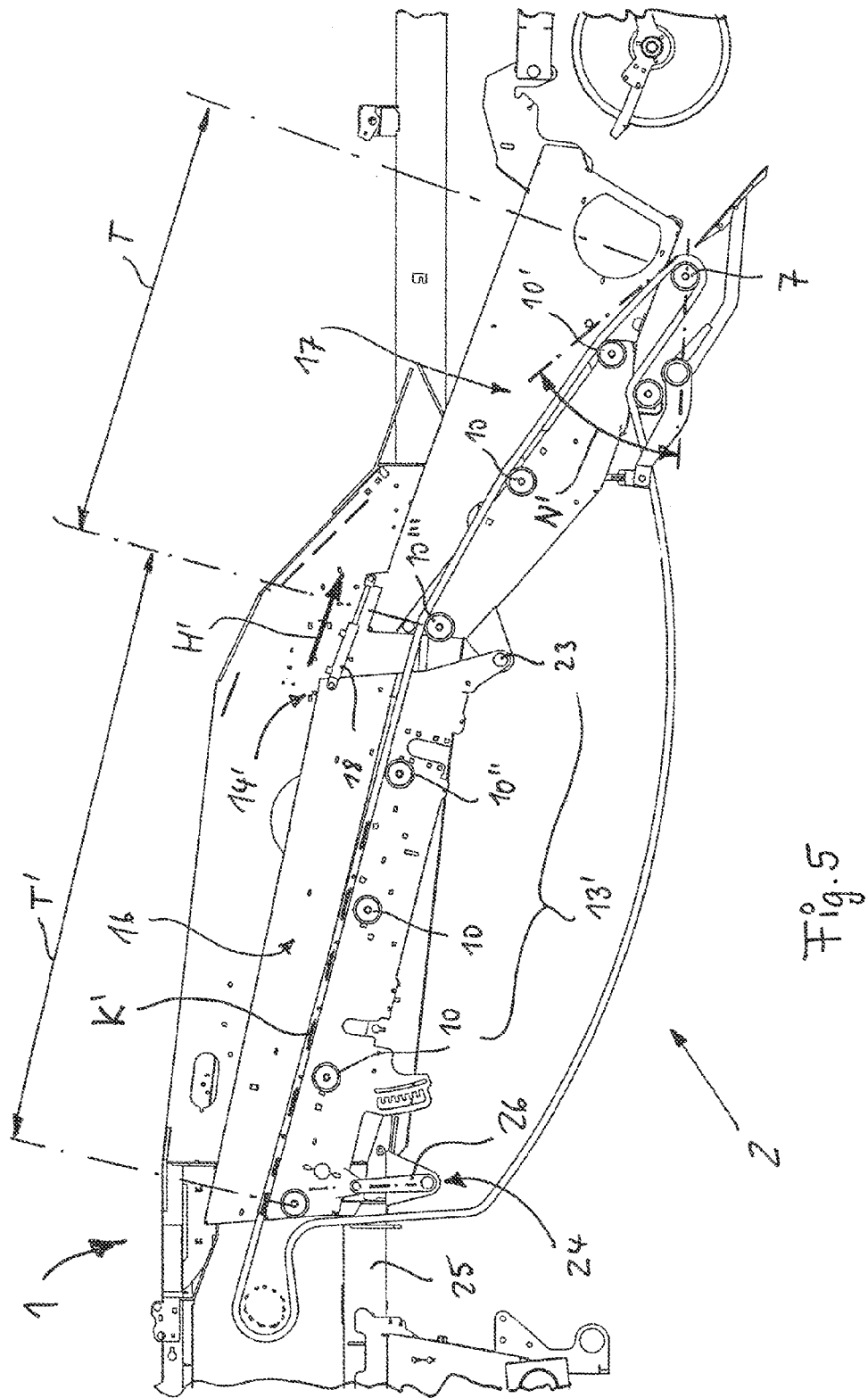
FIG. 5 is a side view similar to FIG. 4 wherein the screen conveyor belt has been moved into a second position of use.

In FIGS. 4 and 5, a second embodiment of the adjusting device 13' is illustrated. At least one of the guide rollers 10, 10' is supported on at least two support sections 16, 17 that are movable by the at least one adjusting member 14' relative to each other. In the illustrated embodiment, on the support sections 16, 17 the respective groups of guide rollers 10 are illustrated wherein the latter or the support sections 16, 17 are moved in the respective lifting direction H' by the action of the adjusting member 14' that is also embodied as a hydraulic cylinder 18. In this connection, it is apparent that the support sections 16, 17 may be connected in the area of a connecting joint 23 so that a movement into the spread-apart position (FIG. 5) or a return from this position (FIG. 4) is possible.

For an advantageous simultaneous displacement of the support sections 16, 17, the connecting joint 23 interacts with a pivot support unit 24 that is located at the opposite end of the support section 16 and has a support lever 26 that is supported in articulated manner on the harvester frame 25. In this way, a synchronous pivot movement C (FIG. 4) that is synchronous to the displacement H' can be carried out. When this is done, the conveying stretch section T, beginning at the spaced-apart guide rollers 10" and 10''' (FIG. 5), is moved as a whole and the conveying stretch section T is tilted "forwardly". Also, it is conceivable that the leading conveying stretch section T is changed with regard to its conveying slant, but the conveying stretch section T' is affected only by "displaced" guide rollers 10, 10" by means of the movement possibility at C (FIG. 4) so that the conveying contour K' in this area can remain substantially unchanged (FIG. 5).

Accordingly, when looking at FIGS. 2 to 5, it is apparent that the guide elements 10, 10' of the support rails 15 or support sections 16, 17 that are oppositely positioned in transverse direction, respectively, are movable by means of the pivot and/or push movement H, H' that is introduced by means of the respective adjusting member 14, 14' and in this way the conveying slants of the neighboring conveying stretch sections T, T', T", T''' of the conveying stretch 5 can be advantageously changed based on different actuation principles. The desired change of the active parameters affecting the harvested mix R in the area of the screen conveyor belt 4 extending with different areas of "steepness" is therefore possible within wide ranges.

It is understood that the adjusting device 13, 13' may be provided with variably usable adjusting members 14, 14' wherein the latter, as needed, can be driven mechanically, electrically and/or hydraulically. The illustrated embodiment, a hydraulic cylinder 18 is used, respectively. It is likewise provided that in the area of the adjusting device 13, 13' also several adjusting members 14, 14' may be provided.

With respect to the substantially mirror-symmetrical support of the screen conveyor belt 4 relative to the longitudinal center plane L, it is understood that the construction parts that are shown in the illustration for one side of the harvester 1 are accordingly provided mirror-symmetrical on the opposite side in the area of the adjusting devices 13, 13'.

Figure 6:
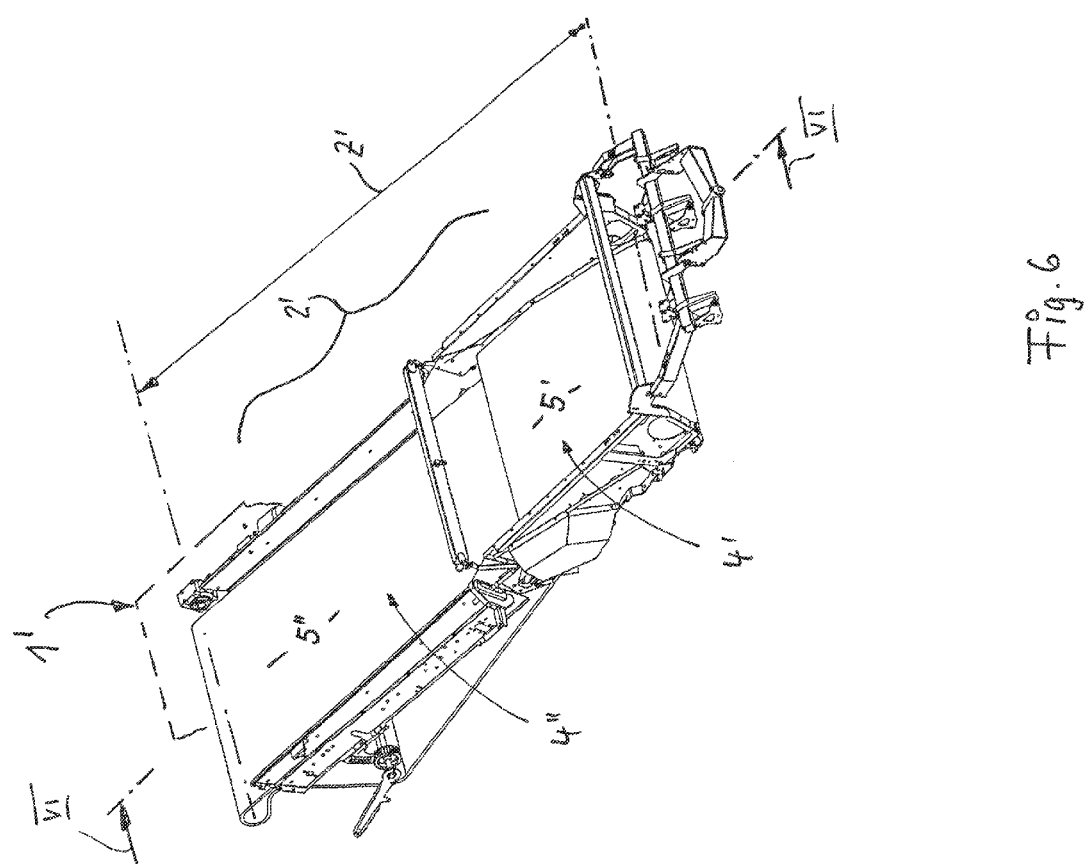
FIG. 6 is a perspective detail illustration of the harvester with a screen conveyor of a second embodiment.
Figure 7:
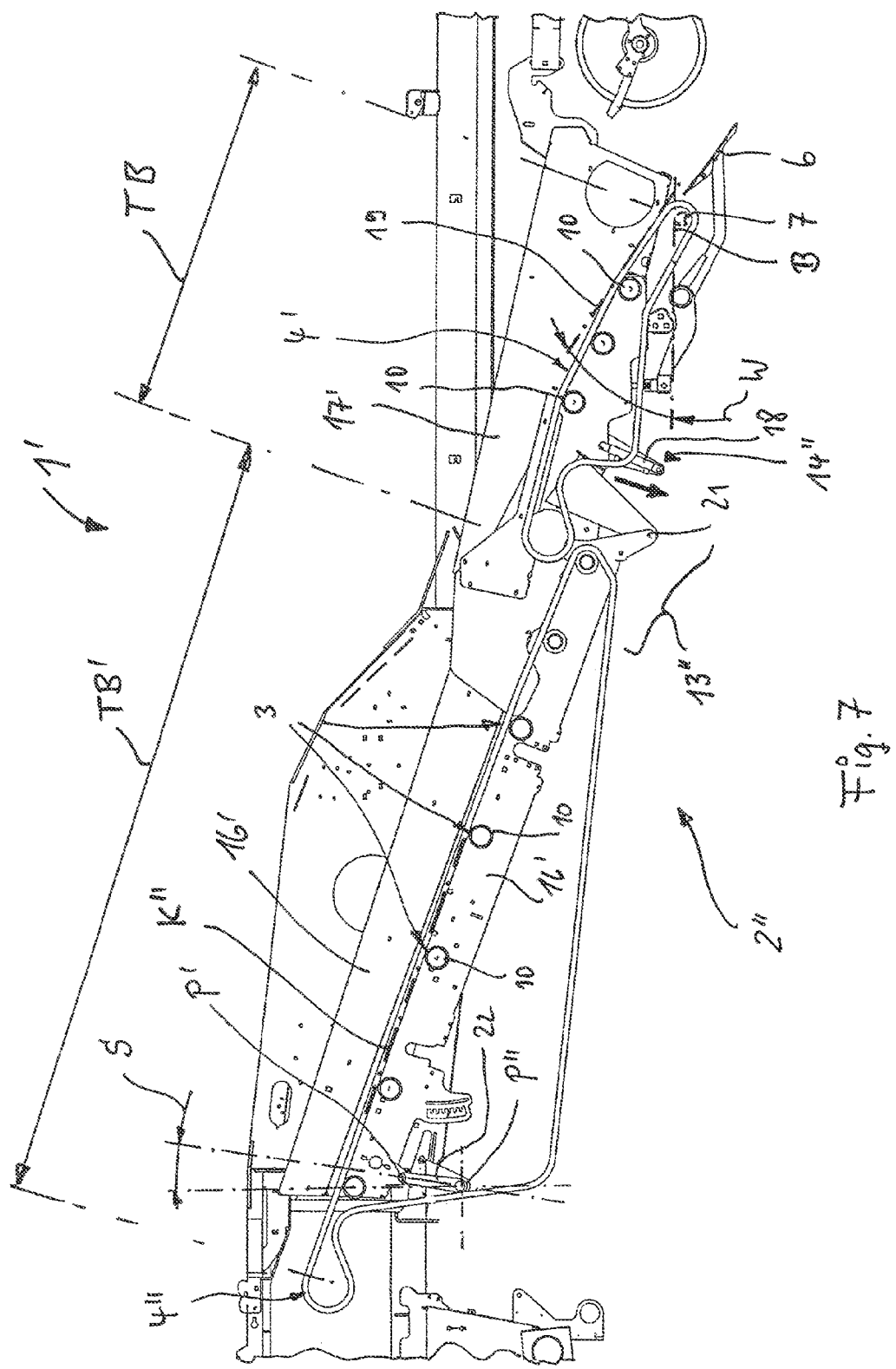
FIG. 7 shows the screen conveyor according to FIG. 6 with two screen conveyor belts in a section illustration according to section line VI-VI of FIG. 6.
Figure 8:
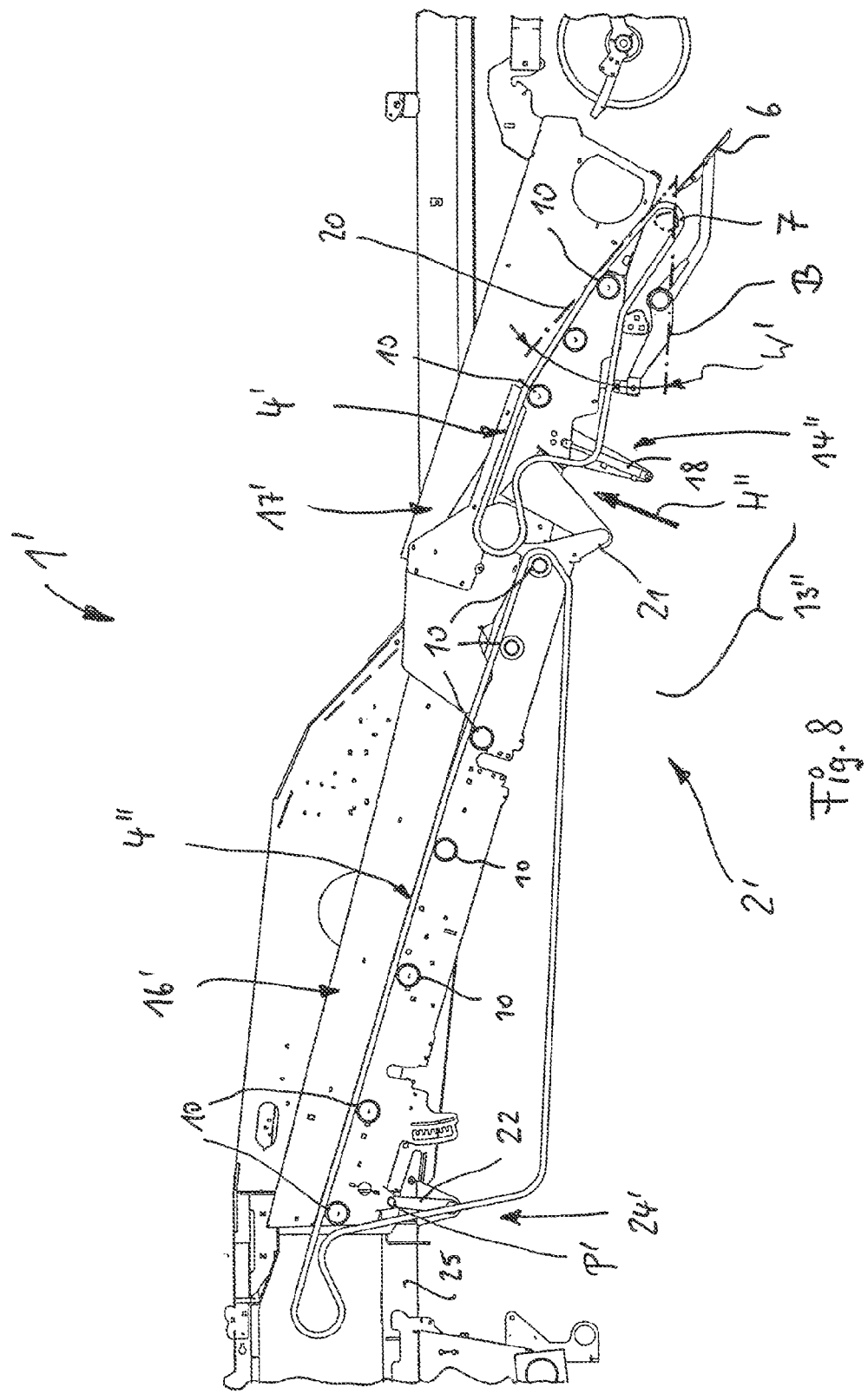
FIG. 8 is a side view similar to FIG. 6 with two screen conveyor belts in a changed position of use.

In the illustrations according to FIGS. 6 to 8, a second embodiment of the harvester 1' is illustrated that has a screen conveyor 2' similar to that described in the preceding embodiment. The parts of substantially identical configuration that have already been shown and explained with respect to their action in connection with the preceding drawings according to FIGS. 1 through 5 will not be shown and discussed again in order to promote clarity.

This construction according to FIG. 6 is characterized in that the screening zone Z' having two conveying stretch sections TB and TB' (FIG. 7) is formed by several, in particular two, screen conveyor belts 4' and 4". By utilizing the principle of action that has already been explained in connection with FIGS. 1 through 5, in this harvester 1' or screen conveyor 2' it is provided that at least the leading screen conveyor belt 4' adjoining immediately the digging shares 6 (FIG. 7) can be adjusted to different conveying slants 19, 20. Also, it is conceivable that the second (trailing) conveyor belt 4" is also provided with adjustable conveying slants (not illustrated) or, in a constructively changed embodiment, only the screen conveyor belt 4' is configured to be adjustable to different conveying slants.

The at least one adjusting member 14' that is required for the adjustability of the screen conveyor belt 4' can be used, as needed, only for one or for both screen conveyor belts 4', 4". For a joint adjustment (without change of the conveying slant in the conveying stretch section TB'), it is provided that the support sections 16' and 17' that receive the guide elements 3 of the two screen conveyor belts 4, 4' are connected to each other (FIG. 7, FIG. 8) in the area of a joint 21 so that principal action adjustments are possible similar to the embodiment of FIG. 4 and FIG. 5.

For this joint adjustment of the conveying stretch sections TB and TB' the support section 16' at the end that is opposite the joint 21 is secured at a point P' on a support lever 22 wherein the latter forms a support point P" on the frame. By movement of the adjusting member 14" in a lifting direction H" the leading screen conveyor belt 4' can be moved into the predetermined inclined position (angle W) and, at the same time, the movement in the area of the joint 21 is transmitted onto the support section 16' wherein the latter is moved in turn about a pivot angle S in the area of the support lever 22; this causes the guide elements 3 to jointly pivot upwardly or be substantially displaced along a contour line K".

The specification incorporates by reference the entire disclosure of German priority document 10 2011 121 180.6 having a filing date of Dec. 16, 2011.

While specific embodiments of the invention have been shown and described in detail to illustrate the inventive principles, it will be understood that the invention may be embodied otherwise without departing from such principles.

What is claimed is:

1. A harvester for potatoes, beets and other root crops, comprising:
digging shares arranged in a leading position in a travel direction of the harvester;
a screen conveyor receiving a harvested mix and conveying the harvested mix in a conveying direction opposite to the travel direction;
wherein the screen conveyor comprises at least one screen conveyor belt and guide elements supporting laterally the at least one screen conveyor belt;
wherein the at least one screen conveyor belt has at least one upwardly facing conveying stretch;
wherein the screen conveyor further comprises a leading return pulley proximal to the digging shares;
wherein the at least one conveying stretch forms a screening zone and the screening zone, at least adjacent to the leading return pulley, is adapted to be oriented so as to ascend in the conveying direction;

wherein the at least one conveying stretch is comprised of conveying stretch sections and said conveying stretch sections are adjustable relative to each other to different conveying slants;

wherein the screen conveyor further comprises an adjusting device engaging lateral edges of the at least one conveying stretch, wherein the lateral edges are positioned opposite each other in a transverse direction transverse to the conveying direction;

wherein the screen conveyor further comprises at least two support sections extending one after another in the conveying direction, wherein the guide elements are secured on the at least two support sections, respectively;

wherein the at least two support sections comprise sides that are facing each other in the conveying direction and the sides that are facing each other each have a first end and a second end, wherein the first ends of the sides that are facing each other are pivotably connected to each other by a common pivot joint and wherein the second ends of the sides that are facing each other are operatively connected to the adjusting device, respectively, and the adjusting device is configured to move the second ends relative to each other so that the first ends rotate relative to each other about the common pivot joint.

2. The harvester according to claim 1, wherein the conveying slants are adjustable to different incline angles relative to a horizontal reference plane.

3. The harvester according to claim 2, wherein the incline angles of the conveying slants are adjustable in a range from 0 degrees up to 60 degrees, preferably from 15 degrees up to 40 degrees.

4. The harvester according to claim 1, wherein at least one of said conveying stretch sections is adjustable continuously.

5. The harvester according to claim 1, wherein at least one of said conveying stretch sections is adjustable during an ongoing conveying phase.

6. The harvester according to claim 1, wherein more than two of said conveying stretch sections are provided that are adjustable relative to each other to incline angles that differ from each other, respectively.

7. The harvester according to claim 6, wherein said conveying stretch sections are adjustable jointly.

8. The harvester according to claim 6, wherein said conveying stretch sections are individually adjustable.

9. The harvester according to claim 1, wherein the guide elements are movable individually or jointly.

10. The harvester according to claim 1, wherein the guide elements are movable in groups.

11. The harvester according to claim 1, wherein the conveying stretch sections include a first conveying stretch section and a second conveying stretch section, wherein the first conveying stretch section extends from the leading return pulley to a first one of the guide elements in the conveying direction, and wherein the second conveying stretch section is positioned downstream of the first conveying stretch section in the conveying direction, wherein the first conveying stretch section has a first incline angle that is different from a second incline angle of said second conveying stretch section such that steep and flat ones of the conveying slants adjoin each other.

12. The harvester according to claim 1, wherein one of the at least two support sections comprises a support section end remote from said sides that are facing each other and said support section end is connected to a pivot support unit that enables a joint pivot and push movement by actuating the adjusting device.

13. The harvester according to claim 1, wherein two sets of said at least two support sections are positioned opposite each other in the transverse direction, wherein the guide elements supported on the two sets of said at least two support sections are movable by a movement introduced by the adjusting device so that the conveying slants of said conveying stretch sections of the at least one conveying stretch are changeable, wherein the movement is selected from the group consisting of a push movement; a pivot movement; and a push and pivot movement.

14. The harvester according to claim 1, wherein the adjusting device comprises at least one adjusting member selected from the group consisting of a mechanically drivable member, electrically drivable member, and hydraulic drivable member.

15. The harvester according to claim 14, wherein the guide elements supported on the at least two support sections are movable by a pivot or push movement introduced by the at least one adjusting member so that the conveying slants of the conveying stretch sections of the at least one conveying stretch are changeable.

16. The harvester according to claim 14, wherein the adjusting device comprises several of said at least one adjusting member.

17. The harvester according to claim 1, wherein several of the at least one screen conveyor belt are provided, said several screen conveyor belts including a leading screen conveyor belt that is positioned immediately adjacent to the digging shares in the conveying direction and further including a trailing screen conveyor belt arranged downstream of the leading screen conveyor belt in the conveying direction , wherein the leading screen conveyor belt is comprised of several first conveying stretch sections adjustable relative to each other to assume different first conveying slants.

18. The harvester according to claim 17, wherein the trailing screen conveyor belt is comprised of several second conveying stretch sections and the second conveying stretch sections are adjustable relative to each other to different second conveying slants.

* * * * *